United States Patent
Smith

(10) Patent No.: US 8,458,998 B2
(45) Date of Patent: Jun. 11, 2013

(54) ROTARY LAWN MOWER CUTTING BLADE

(76) Inventor: Wayne Arthur Smith, Holland Patent, NY (US)

( * ) Notice: Subject to any disclaimer, the term of this patent is extended or adjusted under 35 U.S.C. 154(b) by 0 days.

(21) Appl. No.: 11/706,165

(22) Filed: Feb. 15, 2007

(65) Prior Publication Data

US 2008/0196378 A1    Aug. 21, 2008

(51) Int. Cl.
*A01D 34/73*    (2006.01)

(52) U.S. Cl.
USPC .............................................. 56/255; 56/295

(58) Field of Classification Search
USPC ................ 56/17.5, 255, DIG. 17, DIG. 19, 56/295; D15/17, 255, 295, DIG. 17, DIG. 19; 30/276, 321, 124, DIG. 5, 347, 353, 133
See application file for complete search history.

(56) References Cited

U.S. PATENT DOCUMENTS

| | | | |
|---|---|---|---|
| 1,211,566 A | | 1/1917 | Fortney |
| 2,312,569 A | | 3/1943 | Maga |
| 2,539,779 A | * | 1/1951 | Grosso ............................ 56/16.6 |
| 2,697,323 A | | 12/1954 | Horn |
| 2,721,438 A | * | 10/1955 | O'Maley ........................ 56/295 |
| 2,724,230 A | | 11/1955 | Burmeister |
| 2,786,318 A | | 3/1957 | Caldwell |
| 2,792,770 A | | 5/1957 | Ober |
| 2,836,021 A | | 5/1958 | Wood |
| 2,857,729 A | | 10/1958 | Zoldok |
| 2,886,117 A | | 5/1959 | Benson |
| 2,891,369 A | * | 6/1959 | Rietz ............................... 56/13.8 |
| 2,924,059 A | | 2/1960 | Beeston |
| 3,000,165 A | * | 9/1961 | Etchison ......................... 56/13.4 |
| 3,022,621 A | | 2/1962 | Zavarella |
| 3,093,952 A | * | 6/1963 | Bonser ............................ 56/295 |
| 3,127,939 A | | 4/1964 | Rink |
| 3,133,597 A | | 5/1964 | Smith |
| 3,162,990 A | | 12/1964 | Cook |
| 3,320,733 A | | 5/1967 | Kirk |
| 3,321,026 A | | 5/1967 | Hubbard |
| 3,452,524 A | * | 7/1969 | Guetterman .................... 56/295 |
| 3,485,022 A | | 12/1969 | Freedlander |
| 3,538,692 A | | 11/1970 | Cope |
| 3,686,841 A | * | 8/1972 | Mager et al. .................... 56/17.5 |
| 3,717,985 A | | 2/1973 | Freedlander |
| 3,762,138 A | | 10/1973 | Michael |
| 3,775,878 A | | 12/1973 | Beckner |
| 3,814,189 A | * | 6/1974 | Thompson ...................... 172/13 |
| 3,894,385 A | | 7/1975 | Brown, Jr. |
| 3,923,102 A | * | 12/1975 | Morris ............................ 172/13 |
| 3,998,037 A | | 12/1976 | Deans et al. |
| 4,072,195 A | | 2/1978 | Carlson |
| 4,079,578 A | | 3/1978 | Cornellier |
| 4,149,358 A | | 4/1979 | Comer |
| 4,170,079 A | | 10/1979 | Holekamp |
| 4,257,214 A | * | 3/1981 | Ferguson et al. ............... 56/13.4 |
| 4,269,020 A | | 5/1981 | Wolf et al. |
| 4,297,831 A | | 11/1981 | Pioch et al. |
| 4,318,268 A | | 3/1982 | Szymanis et al. |

(Continued)

*Primary Examiner* — Alicia Torres
(74) *Attorney, Agent, or Firm* — Heslin Rothenberg Farley & Mesiti P.C.

(57) ABSTRACT

A rotary lawn mower cutting blade with reduced drag and improved cutting ability includes a central mounting section, intermediate sections, and outboard sections along a common longitudinal axis and disposed about a common center of rotation. The outboard sections includes downward and inward projecting sections. The cutting blade also preferably includes cutting edges on the full extent of the leading edge of the outboard section including the downward and inward projecting sections. Additionally, the outer section can be twisted slightly to enhance airflow upward.

41 Claims, 2 Drawing Sheets

U.S. PATENT DOCUMENTS

| | | | |
|---|---|---|---|
| 4,320,617 A | 3/1982 | Fedeli et al. | |
| 4,429,518 A | 2/1984 | Fedeli et al. | |
| 4,479,302 A | 10/1984 | Richter | |
| 4,547,966 A | 10/1985 | Eden | |
| 4,573,306 A | 3/1986 | Smith et al. | |
| 4,578,938 A | 4/1986 | Genesco | |
| 4,715,173 A | 12/1987 | Anderson et al. | |
| 4,862,682 A | 9/1989 | Wait et al. | |
| 4,938,012 A | 7/1990 | Klima | |
| 5,036,654 A | 8/1991 | Malutich | |
| 5,056,605 A | 10/1991 | Bond et al. | |
| 5,094,065 A | 3/1992 | Azbell | |
| 5,167,109 A | 12/1992 | Meinerding | |
| 5,199,251 A | 4/1993 | Rouse et al. | |
| 5,233,820 A | 8/1993 | Willsie | |
| 5,291,725 A | 3/1994 | Meinerding | |
| 5,353,581 A | 10/1994 | Rouse et al. | |
| 5,473,873 A | 12/1995 | Sheldon | |
| 5,493,783 A | 2/1996 | Oostendorp | |
| 5,515,670 A | 5/1996 | Meinerding | |
| 5,581,987 A | 12/1996 | Schuyler | |
| 5,592,992 A * | 1/1997 | Thompson | 172/15 |
| 5,711,141 A | 1/1998 | Pitman et al. | |
| 6,050,634 A | 4/2000 | Yamagishi et al. | |
| 6,062,318 A | 5/2000 | Andrews | |
| 6,134,789 A | 10/2000 | Strickland | |
| 6,412,568 B1 | 7/2002 | Thede | |
| 6,487,840 B1 | 12/2002 | Turner | |
| 6,640,449 B1 | 11/2003 | Hoffmann et al. | |
| 6,655,119 B2 | 12/2003 | Hasei et al. | |
| 6,675,569 B2 | 1/2004 | Mannon et al. | |
| 6,679,039 B2 | 1/2004 | Deschamps | |
| 6,854,524 B1 | 2/2005 | Williams | |
| 6,935,095 B1 * | 8/2005 | Sluder | 56/295 |
| 6,951,094 B2 | 10/2005 | Richter | |
| 6,978,590 B1 | 12/2005 | Graham | |
| D523,448 S * | 6/2006 | Jackson | D15/28 |
| 7,096,970 B1 | 8/2006 | Porter et al. | |
| 7,246,669 B2 | 7/2007 | Cammack | |
| 7,299,612 B2 | 11/2007 | Schuyler | |

* cited by examiner

ROTARY LAWN MOWER CUTTING BLADE

BACKGROUND OF THE INVENTION

1. Field of the Invention

The present invention relates to a cutting blade for rotary lawn mowers.

2. Prior Art

Conventional rotary lawn mower cutting blades are made of an elongated flat metal plate, rectangular in shape, with a central mounting portion and an outer portion having a leading beveled cutting edge, and a bend or twist of either the entire outer portion of the blade or just the trailing edge of the outer portion to generate airflow used to draw the uncut grass upward into the path of the cutting edge and to expel the cuttings from the cutting area. Raised teeth may be added to the trailing edge of the outer portion of the blade to produce a mulching action.

The problem with present art rotary lawn mower cutting blades is that the central mounting portion is generally in the same plane as the cutting portion, resulting in lost energy as the central mounting portion passes over and impinges upon the top edge of the cut grass and residual clippings. Energy is wasted, efficiency of the lawn mower is impaired, and airflow through the cutting area is restricted.

It is the object of this invention to provide a novel rotary lawn mower cutting blade which has improved cutting abilities and can operate with greater efficiency.

BRIEF SUMMARY OF THE INVENTION

According to the invention, a rotary lawn mower cutting blade which provides for improved cutting action with greater efficiency, comprises a central mounting portion, two oppositely extending intermediate portions connecting to outer portions which are in turn joined to downward-turned end portions which are in turn joined to inward turned cutting portions.

According to the invention, the downward-turned end portions may be straight or curved and may be directed downward in a perpendicular orientation from the plane of the central mounting portion, or at some obtuse or acute angle therefrom. The downward-turned end portion may also be skewed to the axis of rotation of the cutting blade, which places the leading edge of the end portion at a greater or less distance from the center of rotation than the trailing edge.

According to the invention, airflow can be enhanced during rotation of the blade by applying a slight twist to the intermediate or outer portion of the blade, the trailing edge of the outer portion, the trailing edge of the cutting portion, or some combination thereof.

BRIEF SUMMARY OF THE SEVERAL VIEWS OF THE DRAWING

Reference will be made to the preferred embodiment, examples of which are illustrated in the accompanying drawing figures. The figures are intended to be illustrative, not limiting. Although the invention is generally described in the context of this preferred embodiment, it should be understood that it is not intended to limit the scope of the invention to this particular embodiment.

Certain elements in selected views of the drawings may be illustrated not-to-scale, for illustrative clarity. Elements of the figures can be numbered such that similar (including identical) elements may be referred to with similar numbers in a single drawing. Such relationships, if any, between similar elements in the same or different figures will become apparent throughout the specification, including, if applicable, in the claims and abstract.

Figure 1:
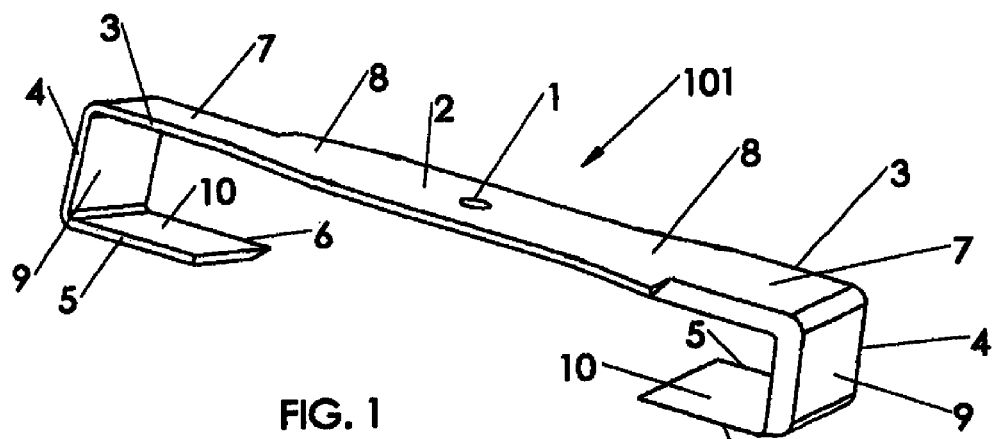
Figure 2:
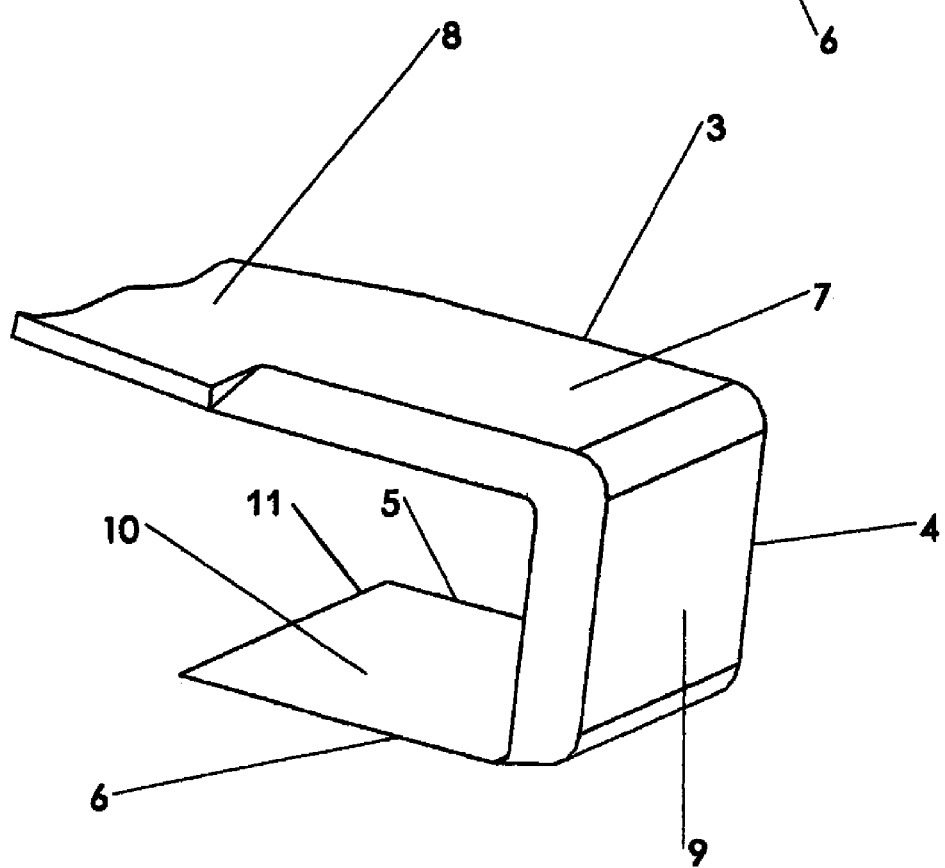
Figure 3:
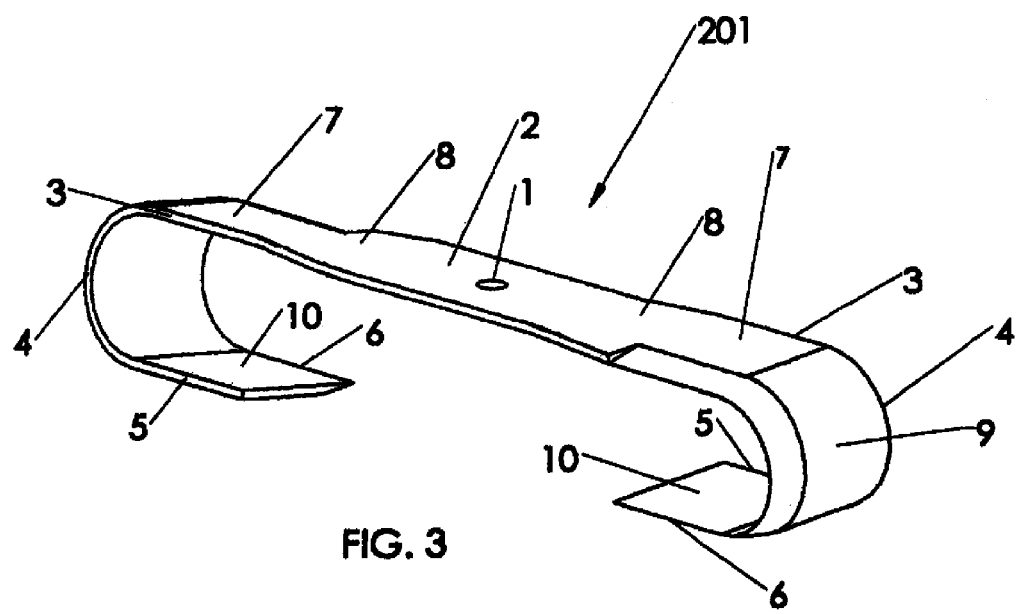
Figure 4:
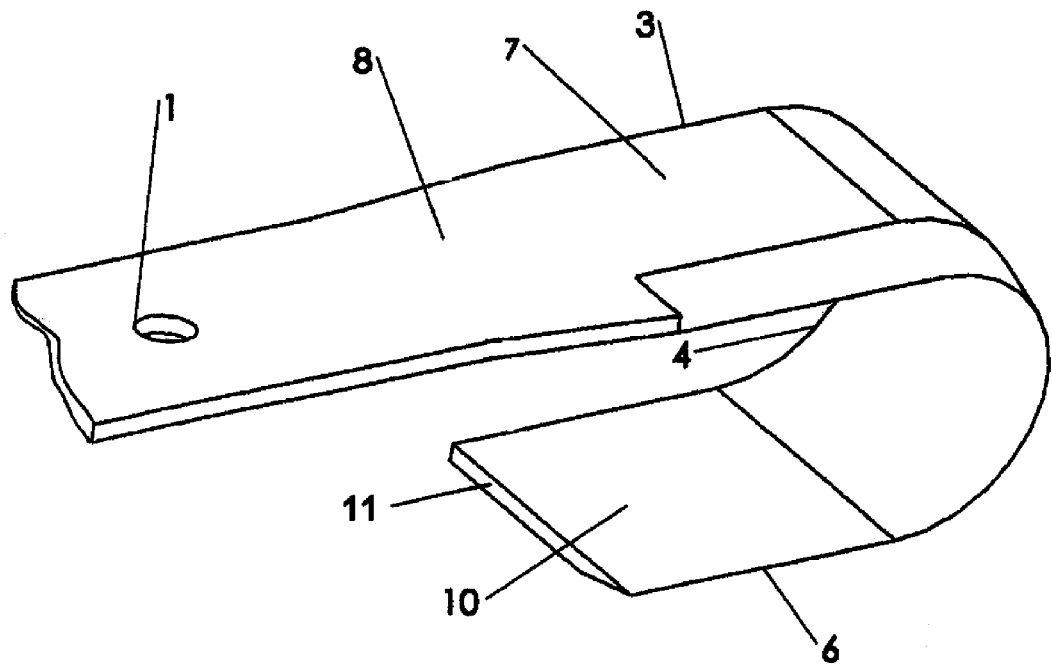

The structure, operation, and advantages of the present preferred embodiment of the invention will become further apparent upon consideration of the following description taken in conjunction with the accompanying drawings, wherein:

FIG. 1 is a perspective view of a first embodiment of a rotary lawn mower cutting blade according to the present invention;

FIG. 2 is a partial perspective view of the outer portion 7 of the cutting blade shown in FIG. 1;

FIG. 3 is a perspective view of a second embodiment of a rotary lawn mower cutting blade according to the present invention;

FIG. 4 is a partial perspective view of the outer portion 7 of the cutting blade shown in FIG. 3. Areas in the respective foreground of FIGS. 1-4 can be regarded as areas forward of the illustrated cutting blade. Areas in the respective background of FIGS. 1-4 can be regarded as areas rearward of the illustrated cutting blade.

DETAILED DESCRIPTION OF THE INVENTION

Referring now to FIG. 1 and FIG. 2, there is shown a rotary mower cutting blade 101 that is an embodiment of the present invention having a central portion 2 which includes a central bore 1 for attaching blade 101 to a source of rotating power. The cutting blade is further provided with outer portions 7 which are joined to the central portion 2 by intermediate portions 8 along a common longitudinal blade axis. The cutting portions 10, which have leading cutting edges 6 and trailing edges 5, are joined to the outer portions 7 through the downward portions 9. The outer portion 7 has a trailing edge 3 and the downward portion 9 has a trailing edge 4. As seen in FIG. 1, the central portions, intermediate portions, and outer portions can be generally planar and can be disposed generally in a common plane. The leading cutting edges 6 of the cutting portions 10, which are beveled from the inner surface of the cutting portion 10 downward in this embodiment, are continued through the downward portions 9 where the bevel direction becomes outward and outer portions 7 where the bevel direction becomes upward, however it of course may be understood that the direction of bevel and portions of the blade which are beveled to form a cutting edge can vary.

In this embodiment, the cutting blade is twisted slightly in the intermediate portion 8. This will facilitate directing air upward during rotation of the cutting blade as air is directed upward along the surface of the outer portion 7 and the cutting portion 10. As an alternative, trailing edge 5 and/or trailing edge 3 can be bent or twisted upward to create upward airflow during rotation of the cutting blade, and can also be formed into teeth as in U.S. Pat. No. 6,487,840 to create a mulching action of the grass clippings.

In this embodiment, the plane of the downward portions 9 are perpendicular to the plane of the central portion 2, however this angular relationship may be acute or obtuse. Therefore, where in this specification and claims I employ the term "downward", I intend an angular relationship which will result in a general downward projection. The plane of the downward portion 9 can also be skewed or twisted in the vertical plane so as to cause the trailing edge 4 to be further away from the center of rotation of the cutting blade than any other point on the surface of the downward portion 9. This vertical twist will result in airflow being directed outward during rotation of the cutting blade which will improve removal of the grass clippings from the cutting area.

FIG. 3 and FIG. 4 illustrates a cutting blade 201 that is a second preferred embodiment of the invention. The cutting blade 201 is substantially identical to cutting blade 101, with the exception that the downward portion 9 is curved rather than straight.

FIG. 3 and FIG. 4 illustrates a cutting blade 201 that is a second preferred embodiment of the invention. The cutting blade 201 is substantially identical to cutting blade 101, with the exception that the downward portion 9 is curved rather than straight. Edge 11 that is shown as being intermediate of edge 5 and edge 6 and which is labeled in FIGS. 2 and 4 and shown through the views can be regarded as an interior edge of the respective cutting portion on which it is included. As shown in FIGS. 1 and 3, an interior edge of a first cutting portion can generally face an interior edge of a second cutting portion.

While this invention has been described in the specification and illustrated in the drawings with respect to a preferred embodiment, it is understood that all changes and modifications that come within the spirit of the invention are desired to be protected. Undoubtedly, many variations or equivalents may be substituted for elements of the invention by one having ordinary skill in the art to which the present invention most nearly pertains, and such variations are intended to be within the scope of the invention, as disclosed herein;

What is claimed is:

1. A rotary lawn mower cutting blade comprising:
a center portion joined to respective intermediate portions which in turn are joined to respective first and second outer portions;
first and second inwardly extending cutting portions defined by planar sections of material, the first inwardly extending cutting portion being joined to said first outer portion through a first downwardly extending end portion extending downwardly from said first outer portion, the second inwardly extending cutting portion being joined to said second outer portion through a second downwardly extending end portion extending downwardly from said second outer portion;
wherein said first inwardly extending cutting portion has an inwardly extending leading cutting edge and an inwardly extending trailing edge, the leading cutting edge of said first inwardly extending cutting portion facing forward of said rotary lawn mower cutting blade and having a "V" shaped cross section, the trailing edge of said first inwardly extending cutting portion facing rearward of said rotary lawn mower cutting blade; and
wherein said second inwardly extending cutting portion has an inwardly extending leading cutting edge and an inwardly extending trailing edge, the leading cutting edge of said second inwardly extending cutting portion facing rearward of said rotary lawn mower cutting blade, the trailing edge of said second inwardly extending cutting portion facing forward of said rotary lawn mower cutting blade and having a cross section different from a cross section of the leading cutting edge of the first inwardly extending cutting portion, and wherein the rotary lawn mower cutting blade is bent or twisted to provide an upward angling of the first inwardly extending cutting portion from the leading cutting edge thereof to the trailing edge thereof and to provide an upward angling of the second inwardly extending cutting portion from the leading cutting edge thereof to the trailing edge thereof.

2. The rotary lawn mower cutting blade of claim 1, wherein said leading cutting edge of said first inwardly extending cutting portion extends contiguously along said first inwardly extending cutting portion and said first downwardly extending end portion.

3. The rotary lawn mower cutting blade of claim 2, wherein the intermediate portions are twisted so as to cause the trailing edges of said first and second cutting portions to be slightly higher than their respective leading cutting edges.

4. The rotary lawn mower cutting blade of claim 2, wherein said cutting blade includes a center of rotation, and wherein a plane or axis of each first and second end portions is skewed causing a first edge of each of said first and second end portions to be closer to said center of rotation than a second edge of each of said first and second end portions.

5. The rotary lawn mower cutting blade of claim 1, wherein said leading cutting edge of said first inwardly extending cutting portion extends contiguously along said first inwardly extending cutting portion, said first downwardly extending end portion, and said first outer portion.

6. The rotary lawn mower cutting blade of claim 5, wherein the intermediate portions are twisted so as to cause the trailing edges of said first and second cutting portions to be slightly higher than their respective leading cutting edges.

7. The rotary lawn mower cutting blade of claim 5, wherein said cutting blade includes a center of rotation, and wherein a plane or axis of each said first and second downwardly extending end portion is skewed causing a first edge of each of said first and second downwardly extending end portions to be closer to said center of rotation than a second edge of each of said first and second downwardly extending end portions.

8. The rotary lawn mower cutting blade of claim 1, wherein the intermediate portions are twisted so as to cause the trailing edges of said first and second inwardly extending cutting portions to be slightly higher than their respective leading cutting edges.

9. The rotary lawn mower cutting blade of claim 1, wherein said cutting blade includes a center of rotation, and wherein the plane or axis of said first and second downwardly extending end portions are skewed causing a first edge of each of said first and second downwardly extending end portions to be closer to said center of rotation than a second edge of each of said first and second downwardly extending end portions.

10. The rotary lawn mower cutting blade of claim 1, wherein each of said first and second outer portions has a leading cutting edge.

11. The rotary lawn mower cutting blade of claim 10, wherein the intermediate portions are twisted so as to cause the trailing edges of said first and second cutting portions to be slightly higher than their respective leading cutting edges.

12. The rotary lawn mower cutting blade of claim 10, wherein said cutting blade includes a center of rotation, and wherein a plane or axis of each said first and second downwardly extending end portions is skewed causing a first edge of each of said first and second downwardly extending end portions to be closer to said center of rotation than a second edge of each of said first and second downwardly extending end portions.

13. The rotary lawn mower cutting blade of claim 1, wherein at least one of said first and second outer portions includes a beveled leading cutting edge.

14. The rotary lawn mower cutting blade of claim 1, wherein said center portion includes mounting means.

15. The rotary lawn mower cutting blade of claim 1, wherein said center portion is adapted to be mounted to an external body.

16. The rotary lawn mower cutting blade of claim 15, wherein said external body is a rotary power source.

17. The rotary lawn mower cutting blade of claim 1, wherein said rotary lawn mower cutting blade is adapted to be mounted to an external body.

18. The rotary lawn mower cutting blade of claim 1, wherein the trailing edges of the first and second inwardly extending cutting portion are higher than their respective leading cutting edges by sufficient degree so as to result in upward air flow in sufficient magnitude as to direct grass clippings upward when the rotary lawn mower cutting blade is rotated with use of a rotary power source.

19. A rotary lawn mower cutting blade comprising:
a center portion joined to respective intermediate portions which in turn are joined to respective first and second horizontally extending outer portions, each of the first and second horizontally extending outer portions having a forward facing edge and a rearward facing edge, the first and second horizontally extending outer portions extending generally in a first plane;
first and second inwardly extending cutting portions, the first inwardly extending cutting portion extending inwardly to a first distance and being joined to said first horizontally extending outer portion through a first downwardly extending portion extending downwardly from said first horizontally extending outer portion, the second inwardly extending cutting portion being joined to said second horizontally extending outer portion through a second downwardly extending portion extending downwardly from said second horizontally extending outer portion;
wherein each of said first and second inwardly extending cutting portions has a forward facing edge, and a rearward facing edge, wherein a leading cutting edge is defined at said forward facing edge of said first inwardly extending cutting portion, wherein a horizontally extending sharpened edge is defined at said forward facing edge of said first horizontally extending outer portion, wherein a leading cutting edge is defined at said rearward facing edge of said second inwardly extending cutting portion, and wherein a horizontally extending sharpened edge is defined at said rearward facing edge of said second horizontally extending outer portion, wherein the horizontally extending sharpened edge defined at said forward facing edge of said first horizontally extending outer portion has a "V" shaped vertical cross section, and wherein the horizontally extending sharpened edge defined at said rearward facing edge of said second horizontally extending outer portion has a "V" shaped vertical cross section.

20. The rotary lawn mower cutting blade of claim 19, wherein said leading cutting edge of said first inwardly extending cutting portion extends contiguously along said first inwardly extending cutting portion and said first downwardly extending portion.

21. The rotary lawn mower cutting blade of claim 20, wherein the leading cutting edge of the first inwardly extending cutting portion includes a sharpened edge, and wherein the first inwardly extending cutting portion has a trailing edge, wherein the leading cutting edge of the second inwardly extending cutting portion includes a sharpened edge, wherein the second inwardly extending cutting portion includes a trailing edge formed into teeth, wherein the intermediate portions are twisted so as to cause the trailing edges of said first and second inwardly extending cutting portions to be slightly higher than their respective leading cutting edges.

22. The rotary lawn mower cutting blade of claim 20, wherein said cutting blade includes a center of rotation, and wherein the plane or axis of said first and second downwardly extending portions are skewed causing a first edge of each of said first and second downwardly extending portions to be closer to said center of rotation than a second edge of each of said first and second downwardly extending portions.

23. The rotary lawn mower cutting blade of claim 19, wherein said leading cutting edge of said first inwardly extending cutting portion extends contiguously along said first inwardly extending cutting portion, said first downwardly extending portion, and joins with said horizontally extending sharpened edge defined at said forward facing edge of said first outer portion.

24. The rotary lawn mower cutting blade of claim 23, wherein the leading cutting edge of the first inwardly extending cutting portion includes a sharpened edge, and wherein the first inwardly extending cutting portion has a trailing edge, wherein the leading cutting edge of the second inwardly extending cutting portion includes a sharpened edge, wherein the second inwardly extending cutting portion includes a trailing edge, wherein the intermediate portions are twisted so as to cause the trailing edges of said first and second inwardly extending cutting portions to be slightly higher than their respective leading cutting edges.

25. The rotary lawn mower cutting blade of claim 23, wherein said cutting blade includes a center of rotation, and wherein the plane or axis of said first and second downwardly extending portions are skewed causing a first edge of each of said first and second downwardly extending portions to be closer to said center of rotation than a second edge of each of said first and second downwardly extending portions.

26. The rotary lawn mower cutting blade of claim 19, wherein the first inwardly extending cutting portion has a trailing edge defined at the rearward facing edge of the first inwardly extending cutting portion wherein the second inwardly extending cutting portion has a trailing edge defined at said forward facing edge of said second inwardly extending cutting portion;
wherein the intermediate portions are twisted so as to cause trailing edges of said first and second inwardly extending cutting portions to be slightly higher than their respective sharpened edges.

27. The rotary lawn mower cutting blade of claim 19, wherein said cutting blade includes a center of rotation, and wherein a plane or axis of each said first and second downwardly extending portions is skewed causing a first edge of each of said first and second downwardly extending portions to be closer to said center of rotation than a second edge of each of said first and second downwardly extending portions.

28. The rotary lawn mower cutting blade of claim 19, wherein said leading cutting edge of said first inwardly extending cutting portion is beveled to define said sharpened edge.

29. The rotary lawn mower cutting blade of claim 19, wherein said center portion includes mounting means.

30. The rotary lawn mower cutting blade of claim 19, wherein said center portion is adapted to be mounted to an external body.

31. The rotary lawn mower cutting blade of claim 30, wherein said external body is a rotary power source.

32. The rotary lawn mower cutting blade of claim 19, wherein said rotary lawn mower cutting blade is adapted to be mounted to an external body.

33. The rotary lawn mower cutting blade of claim 19, wherein the leading cutting edge of the first inwardly extending cutting portion includes a sharpened edge, and wherein the first inwardly extending cutting portion has a trailing edge, wherein the leading cutting edge of the second inwardly extending cutting portion includes a sharpened edge, wherein the second inwardly extending cutting portion includes a trailing edge, wherein the intermediate portions are twisted so as to cause the trailing edges of said first and second inwardly extending cutting portions to be slightly higher than their respective leading cutting edges.

34. The rotary lawn mower cutting blade of claim 19, wherein said cutting blade includes a center of rotation, and wherein the plane or axis of said first and second downwardly extending portions are skewed causing a first edge of each of said first and second downwardly extending portions to be closer to said center of rotation than a second edge of each of said first and second downwardly extending portions.

35. The rotary lawn mower cutting blade of claim 19, wherein the first and second horizontally extending outer portions extend along a common axis.

36. The rotary lawn mower cutting blade of claim 19, wherein the first downwardly extending portion is curved from a perspective of a front view of the rotary lawn mower cutting blade.

37. A rotary lawn mower cutting blade comprising:
a center portion joined to respective intermediate portions which in turn are joined to respective first and second outer portions;
first and second inwardly extending cutting portions, the first inwardly extending cutting portion being joined to said first outer portion through a first downwardly extending end portion extending downwardly from said first outer portion, the second inwardly extending cutting portion being joined to said second outer portion through a second downwardly extending end portion extending downwardly from said second outer portion;
wherein said first inwardly extending cutting portion has an inwardly extending leading cutting edge and an inwardly extending trailing edge, the leading cutting edge of said first inwardly extending cutting portion facing forward of said rotary lawn mower cutting blade and having an adaption to facilitate cutting grass, the trailing edge of said first inwardly extending cutting portion facing rearward of said rotary lawn mower cutting blade;
wherein said second inwardly extending cutting portion has an inwardly extending leading cutting edge and an inwardly extending trailing edge, the leading cutting edge of said second inwardly extending cutting portion facing rearward of said rotary lawn mower cutting blade, the trailing edge of said second inwardly extending cutting portion facing forward of said rotary lawn mower cutting blade and being devoid of the adaption to facilitate cutting grass,
wherein the rotary lawn mower cutting blade is bent or twisted to provide an upward angling of the first inwardly extending cutting portion from the leading cutting edge thereof to the trailing edge thereof and to provide an upward angling of the second inwardly extending cutting portion from the leading cutting edge thereof to the trailing edge thereof;
wherein the rotary lawn mower cutting blade is rotated with use of a rotary power source that rotates the rotary lawn mower cutting blade with speed that generates an air flow that directs movement of grass clippings.

38. The rotary lawn mower cutting blade of claim 37, wherein the rotary lawn mower cutting blade is rotated with use of a rotary power source that rotates the rotary lawn mower cutting blade with speed that generates an air flow that directs movement of grass clippings away from a cutting area.

39. An apparatus comprising:
a rotary lawn mower cutting blade including a center portion joined to respective intermediate portions which in turn are joined to respective first and second outer portions;
wherein said rotary lawn mower cutting blade further has first and second inwardly extending cutting portions, the first inwardly extending cutting portion being joined to said first outer portion through a first downwardly extending end portion extending downwardly from said first outer portion, the second inwardly extending cutting portion being joined to said second outer portion through a second downwardly extending end portion extending downwardly from said second outer portion;
wherein said first inwardly extending cutting portion has an inwardly extending leading cutting edge and an inwardly extending trailing edge, the leading cutting edge of said first inwardly extending cutting portion facing forward of said rotary lawn mower cutting blade and having a "V" shaped cross section with the point of the "V" being directed generally forward, the trailing edge of said first inwardly extending cutting portion facing rearward of said rotary lawn mower cutting blade;
wherein said second inwardly extending cutting portion has an inwardly extending leading cutting edge and an inwardly extending trailing edge, the leading cutting edge of said second inwardly extending cutting portion facing rearward of said rotary lawn mower cutting blade, the trailing edge of said second inwardly extending cutting portion facing forward of said rotary lawn mower cutting blade; and
wherein the rotary lawn mower cutting blade is bent or twisted to provide an upward angling of the first inwardly extending cutting portion from the leading cutting edge thereof to the trailing edge thereof and to provide an upward angling of the second inwardly extending cutting portion from the leading cutting edge thereof to the trailing edge thereof; and
a high speed machine rotary power source rotating the rotary lawn mower cutting blade.

40. The apparatus of claim 39, wherein the apparatus is configured so that the rotary power source rotates the rotary lawn mower cutting blade with speed that generates an air flow that directs movement of grass clippings away from a cutting area.

41. A method comprising:
providing a rotary lawn mower cutting blade including a center portion joined to respective intermediate portions which in turn are joined to respective first and second outer portions, wherein said rotary lawn mower cutting blade further has first and second inwardly extending cutting portions, the first inwardly extending cutting portion being joined to said first outer portion through a first downwardly extending end portion extending downwardly from said first outer portion, the second inwardly extending cutting portion being joined to said second outer portion through a second downwardly extending end portion extending downwardly from said second outer portion, wherein said first inwardly extending cutting portion has an inwardly extending leading cutting edge and an inwardly extending trailing edge, the leading cutting edge of said first inwardly extending cutting portion facing forward of said rotary lawn mower cutting blade, the trailing edge of said first inwardly extending cutting portion facing rearward of said rotary lawn mower cutting blade, and wherein said second inwardly extending cutting portion has an inwardly extending leading cutting edge and an inwardly extending trailing edge, the leading cutting edge of said second inwardly extending cutting portion facing rearward of said rotary lawn mower cutting blade, the trailing edge of said second inwardly extending cutting portion facing forward of said rotary lawn mower cutting blade, and wherein the rotary lawn mower cutting blade is bent or twisted to provide an upward angling of the first inwardly extending cutting portion from the leading cutting edge to the trailing edge thereof and to provide an upward angling of the second inwardly extending cutting portion from the leading cutting edge thereof to the trailing edge;

rotating the rotary lawn mower cutting blade at a speed that generates an air flow that directs movement of grass clippings; and with the rotary lawn mower cutting blade being rotated at a speed that generates an air flow that directs movement of grass clippings, laterally moving the rotary lawn mower cutting blade over an area of a lawn.

\* \* \* \* \*